United States Patent [19]
Sugimoto et al.

[11] Patent Number: 4,871,501
[45] Date of Patent: Oct. 3, 1989

[54] PROCESS FOR MELT SPINNING AROMATIC POLYESTER

[75] Inventors: Hiroaki Sugimoto, Takatsuki; Kazuo Hayatsu, Ibaraki; Toshiyuki Kobashi; Seiji Takao, both of Okayama, all of Japan

[73] Assignees: Sumitomo Chemical Company; Japan Exlan Company, Ltd., both of Osaka, Japan

[21] Appl. No.: 73,342

[22] Filed: Jul. 13, 1987

Related U.S. Application Data

[63] Continuation of Ser. No. 794,793, Nov. 4, 1985, abandoned.

[30] Foreign Application Priority Data

Nov. 9, 1984 [JP] Japan ................................ 59-236965
Nov. 21, 1984 [JP] Japan ................................ 59-246728

[51] Int. Cl.$^4$ .......................... D01D 1/10; D01F 6/62
[52] U.S. Cl. ................................ 264/211.22; 264/349
[58] Field of Search ...................... 264/211.21, 211.22, 264/211.23, 344, 349; 425/207, 208

[56] References Cited

U.S. PATENT DOCUMENTS

| Re. 23,948 | 2/1955 | Filler | 425/204 |
| 3,068,514 | 12/1962 | Street | 366/83 |
| 3,596,320 | 8/1971 | Manning et al. | 264/349 |
| 4,183,895 | 1/1980 | Luise | 264/345 |
| 4,280,802 | 7/1981 | Lang et al. | 425/208 |
| 4,325,903 | 4/1982 | Wissbrun et al. | 528/176 |

FOREIGN PATENT DOCUMENTS 1507207 4/1978 United Kingdom .

Primary Examiner—Hubert Lorin
Attorney, Agent, or Firm—Stevens, Davis, Miller & Mosher

[57] ABSTRACT

Aromatic polyester fibers having high strength and high modulus of elasticity can be obtained stably for a long period of time by melt spinning by using a screw type extruder having a screw which has a compression ratio of 2.5 to 4.0 and thereby inhibiting entrapment in the resultant molten polyester of gases present in or on prowders, granules or pellets being melted, and by back pressure of the molten polyester sending gas generated by decomposition of the molten polyester to a back portion of the extruder, and then extruding and melt spinning the molten polyester at a temperature of 280° C. to 420° C.

4 Claims, No Drawings

PROCESS FOR MELT SPINNING AROMATIC POLYESTER

This application is a continuation of application Ser. No. 794,793, filed Nov. 4, 1985, now abandoned.

BACKGROUND OF THE INVENTION

This invention relates to a process for producing aromatic polyester fibers having high strength and a high modulus of elasticity by melt spinning with stable operation for a long period of time.

Recently, it has been disclosed that aromatic polyesters showing optical anisotropy in the molten state can form fibers having high strength and a high modulus of elasticity by melt spinning. Melt spinning has many advantages in that no solvent is used and, conventional spinning apparatus can be employed. But aromatic polyesters, which can yield fibers having high strength and a high modulus of elasticity by spinning, readily decompose during spinning or generate bubbles by reactions such as polymerization, crosslinking, etc., due to the high spinning temperature.

Aromatic polyesters showing optical anisotropy in the molten state, unlike conventional polyesters, nylons, etc., have a softening temperature and a melting temperature very close each to other and a large temperature dependence of the viscosity of the melt so that rapid melting of the resins takes place at the melting portion in a screw type extruder to produce a melt having a very low viscosity. Thus, it is very difficult to deaerate in the molten state, which results in making it impossible to spin continuously a long period of time.

Heretofore, there have been proposed various processes for melt spinning aromatic polyesters showing optical anisotropy in the molten state (e.g. Japanese Patent Examined Publication No. 482/80), but these processes, as exemplified, were carried out only on a small scale at a laboratory stage. Therefore, development of a process for the stable melt spinning of the aromatic polyesters showing anisotropy has been desired.

SUMMARY OF THE INVENTION

It is an object of this invention to provide a process for melt spinning an aromatic polyester showing anisotropy in the molten state continuously for a long period of time. It is another object of this invention to provide a process for melt spinning an aromatic polyester showing anisotropy in the molten state while removing bubbles effectively. It is a further object of this invention to provide a process for melt spinning an aromatic polyester showing anisotropy in the molten state continuously for a long period of time even in the presence of bubbles which are difficult to remove.

This invention provides a process for melt spinning an aromatic polyester showing anisotropy in the molten state by using a screw type extruder for melting the aromatic polyester, characterized in that the screw type extruder has a screw having a compression ratio of 2.5 to 4.0 and/or a kneading function.

DESCRIPTION OF THE PREFERRED EMBODIMENTS

The aromatic polyester used in this invention is one showing anisotropy in the molten state.

The aromatic polyester showing anisotropy in the molten state means an aromatic polyester having the property of transmitting light in the temperature range of the flowable state when measured by placing a polyester sample powder on a heating sample table interposed between two polarizing plates crossed at 90° and heating the polyester sample.

Such an aromatic polyester is mainly produced from one or more aromatic dicarboxylic acids, one or more aromatic diols and/or one or more aromatic hydroxycarboxylic acids, or derivatives of these compounds. In some cases, the aromatic polyester may be copolymers prepared from one or more of these compounds mentioned above with one or more members selected from alicyclic dicarboxylic acids, alicyclic diols, aliphatic diols, and derivatives thereof.

Examples of the aromatic dicarboxylic acids are terephthalic acid, isophthalic acid, 4,4'-dicarboxydiphenyl, 2,6-dicarboxynaphthalene, 1,2-bis(4-carboxyphenoxy)ethane, etc., and nuclear-substituted derivatives thereof substituted with one or more alkyl, aryl, alkoxy groups and/or halogens.

Examples of the aromatic diols are hydroquinone, resorcinol, 4,4'-dihydroxydiphenyl, 4,4'-dihydroxybenzophenone, 4,4'-dihydroxydiphenylmethane, 4,4'-dihydroxydiphenylethane, 2,2-bis(4-hydroxyphenyl)propane, 4,4'-dihydroxydiphenyl ether, 4,4'-dihydroxydiphenylsulfone, 4,4'-dihydroxydiphenylsulfide, 2,6-dihydroxynaphthalene, 1,5-dihydroxynaphthalene, etc., and nuclearsubstituted derivatives thereof substituted with one or more alkyl, aryl, alkoxy groups and/or halogens.

Examples of the aromatic hydroxycarboxylic acids are p-hydroxybenzoic acid, m-hydroxybenzoic acid, 2-hydroxynaphthalene-6-carboxylic acid, 1-hydroxynaphthalene-5-carboxylic acid, P-(4-hydroxyphenyl)-benzoic acid, etc., and nuclear-substituted derivatives thereof substituted with one or more alkyl, aryl, alkoxy groups and/or halogens.

Examples of the alicyclic dicarboxylic acids are trans-1,4-dicarboxycyclohexane, cis-1,4-dicarboxycylohexane, etc., and nuclear-substituted derivatives thereof substituted with one or more alky, aryl groups and/or halogens.

Examples of the alicyclic and aliphatic diols are trans-1,4-dihydroxycyclohexane, cis-1,4-dihydroxycyclohexane, ethylene glycol, 1,4-butanediol, xylylenediol, etc.

Among various combinations of the above-mentioned compounds, preferred aromatic polyesters are as follows:

(1) Copolyesters comprising 40 to 70% by mole of p-hydroxybenzoic acid residual groups, 15 to 30% by mole of aromatic dicarboxilic acid residual groups, and 15 to 30% by mole of aromatic diol residual groups.

(2) Copolyesters obtained from terephthalic acid and/or isophthalic acid, chlorohydroquinone, phenylhydroquinone and/or hydroquinone.

(3) Copolyesters comprising 20 to 80% by mole of p-hydroxybenzoic acid residual groups and 20 to 80% by mole of 2-hydroxynaphthalene-6-carboxylic acid residual groups.

The aromatic polyester used in this invention can be prepared by polycondensation of these starting materials alone or by esterification with one or more aliphatic or aromatic monocarboxylic acids or derivatives thereof, aliphatic alcohols or phenols or derivatives thereof.

As the polycondensation reaction, there can be employed conventional bulk polymerization, solution polymerization, suspension polymerization, and the like.

The polycondensation reaction can be carried out at 150 to 360° C. under an atmospheric pressure or a reduced pressure of 10 to 0.1 torr, and if necessary using a polymerization catalyst such as a Sb, Ti or Ge compound, a phosphorus series compound stabilizer, a filler such as $TiO_2$, $CaCO_3$ or talc., etc.

The resulting polymer can be used as the material for spinning as is or by subjecting it to heat treatment in the form of powder in an inert gas or under a reduced pressure. The material for spinning can also be prepared by granulating the polyester powder using an extruder.

The aromatic polyester usable in this invention has a molecular weight range suitable for spinning. But the conventional definition of molecular weight cannot be applied to the aromatic polyester usable in this invention, since there is no solvent capable of dissolving the polymer uniformly irrespective of its composition or structure, and conventional methods for measuring molecular weight lack precision. Instead, the present inventors have introduced "flowing temperature" as a physical property value corresponding to the molecular weight. Flowing temperature is defined as the temperature at which an aromatic polyester sample placed in a flow tester CFT-500 (manufactured by Shimadzu Seisakusho, Ltd.) having a nozzle of 1 mm in diameter and 10 mm in length flows through the nozzle with an apparent viscosity of 48,000 when heated at a rate of 4° C./min under a pressure of 100 kg/cm$^2$.

The flowing temperature for forming polyester fibers having high strength and high modulus of elasticity is preferably 280° to 380° C. When an aromatic polyester has a flowing temperature lower than that defined above, there arise problems in that a reaction readily takes place in the molten state, the resulting fibers are poor in elongation, and the like. On the other hand, when the aromatic polyester has flowing temperature higher than that defined above, spinning temperature must be made so high that decomposition or crosslinking reaction readily takes place or the load to the apparatus becomes large.

As an apparatus for melt spinning, there can be used conventional screw type extruders.

The temperature suitable for the melt spinning is 280 to 420° C., more preferably 300 to 400° C., for the reasons mentioned above.

The screw type extruders should have screws having a compression ratio of 2.5 to 4.0 and/or a kneading function.

The compression ratio is defined by a ratio (value) of the area (a maximum resin area) obtained by subtracting the cross-sectional area of a screw from the cross-sectional area of a cylinder at a portion where the resin is supplied to the screw, to a minimum resin area at the top portion of the screw to which the largest compression is applied.

By using a screw having the compression ratio of 2.5 to 4.0, it beceoms possible to inhibit the entrapment of gases in or on the powders, granules or pellets of aromatic polyesters to be spun into the molten resin, and to send the gas generated by decomposition during the residence of resin in the high temperature portion of the cylinder to a back portion by back pressure of the resin melt.

When a screw having a compression ratio of less than 2.5 is used, deaeration of the melt is insufficient. On the other hand, when a screw having a compression ratio of more than 4.0 is used, the revolution load to the screw becomes large. In order to prevent such a large revolution load, it is necessary to raise the cylinder temperature, or to raise the pre-heat temperature.

Further, a melt obtained from an aromatic polyester showing anisotropy has a low viscosity in the molten state and the difficulty of deaeration is increased. Therefore, there often take place problems of an increase of bubbles contained in extruded filaments and breaking of the filaments. But such problems can be solved by using a screw having a compression ratio of 2.5 to 4.0. That is, the filaments obtained by spinning contain as few bubbles as possible, and have a narrow strength distribution, yielding fibers of high strength.

On the other hand, when the screw has a kneading function, uniformity in mixing of the aromatic polyester is improved and bubbles in a raw material melt, where bubbles cannot be removed sufficiently by the back pressure of screw can be divided finely and dispersed. As a result, breaking of filaments caused at the time of extruding the melt from the nozzles is decreased, and continuous spinning results.

A structure of screw having a kneading function includes, for example, a structure obtained by replacing a part of the helical shape of the screw by a combination of several to several tens of circular plates attached to the axis of the screw perpendicular to lengthwise direction, a structure obtained by providing cutting to the circular plates mentioned above, a structure obtained by making the helical shape of screw multiple, a structure obtained by making a part of the helical shape of screw reverse in direction, a structure obtained by attaching a number of projections to the helical shape of the screw, and the like.

Bubbles in the melt are derived from gases contained in or on the powders, granules or pellets of the aromatic polyester, and gases generated by decomposition reactions and the like when they are at high temperatures. Considering the stability of the spinning and the quality of fibers obtained, it is preferable to make the size of the bubbles contained in the melt smaller.

By the use of a screw having a kneading function, stable spinning operation becomes possible. Further, bubbles in the fibers obtained becomes smaller and defects in physical properties caused by the bubbles are decreased, so that there can be obtained fibers of high quality with narrow distribution of strength. In addition, the diameter of bubbles can be made 30 μm or less by using a screw having a kneading function, which results in greatly contributing to stable spinning as well as to improvement of quality of fibers obtained.

In the cases mentioned above, known apparatus such as gear pumps, and the like can be used as they are.

When the screw having a compression ratio of 2.5 to 4.0 and a kneading function is used, the best results can be obtained; that is, the deaeration can be conducted adequately, stable spinning becomes possible due to very fine dispersion of the remaining bubbles, and high quality fibers can be obtained.

Fibers obtained by melt spinning according to this invention can be taken up or drawn down as they are or after attaching an oiling agent thereto. The windup speed or drawdown speed is usually 10 to 10000 m/min. Considering productivity and stable spinning, the windup speed or drawdown dpeed of 100 to 2000 m/min in preferable.

The fineness and cross-sectional shape of fibers obtained can be selected depending on the use. Considering strength and modulus of elasticity, preferable filament fineness is 0.5 to 10 denier. The fibers obtained can be used as they are, but by subjecting the fibers to heat treatment, drawing, or a combination of the two, the fibers are further improved in strength and elasticity.

This invention is illustrated by way of the following Examples and Comparative Examples, wherein the following test methods are employed:

Tensile test: Using an Instron universal tester No. 1130, a fiber sample was subjected to the test with a sample distance of 20 mm, and tension speed of 0.5 mm/min.

Optical anisotropy: A sample was placed on a heating stage, heated at a rate of 25° C./min and observed with the naked eye under polarized light circumstances.

Reference Example 1

In a vessel equipped with a comb type stirrer, 7.20 kg (40 moles) of p-acetoxybenzoic acid, 2.49 kg (15 moles) of terephthalic acid, 0.83 kg (5 moles) of isophthalic acid, and 5.45 kg (20.2 moles) of 4,4'-diacetoxydiphenyl were placed and heated with strong stirring under a nitrogen atmosphere to carry out the polymerization at 330° C. for 3 hours, while removing generated acetic acid out of the system. Then, the contents of the vessel were cooled gradually and the polymer was taken out of the system at 200° C. The amount of the polymer obtained was 10.88 kg and 97.8% of the theoretical yield. The polymer was pulverized by a hammer mill (manufactured by Hosokawa Micron Co., Ltd.) to give particles having a particle size of 2.5 mm or less. The particles were treated in a rotary kiln at 280° C. for 5 hours under nitrogen atmosphere to make the flowing temperature 326° C. Optical anisotropy was observed over 350° C. or higher.

Reference Example 2

Using the same apparatus as used in Reference Example 1, a copolyester of 2,5-diacetoxybiphenyl and terephthalic acid was synthesized in the same manner as described in Reference Example 1. The resulting polymer had a flowing temperature of 318° C., and optical anisotropy was observed at 340° C. or higher.

EXAMPLE 1

The polyester obtained in Reference Example 1 was melt spun using a screw type extruder having one axis of 30 mm in diameter. The screw had a compression ratio of 3.2, but not a kneading function, and an effective length of 120 cm. The temperature of the cylinder top portion was 370° C. and the spinnerette temperature was 365° C. The spinnerette had 150 orifices, the diameter of which was 0.12 mm, and a hole length of 0.1 mm. The molten polymer was extruded from all 150 orifices continuously to produce pale yellow transparent filaments.

The number of bubbles in the fibers obtained was 5.3 per meter among 150 fibers of 50 mm long. When the fibers were subjected to a heat treatment at 320° C. for 3 hours in nitrogen, the resulting fibers had a fineness of 3.23 denier, a strength of 29.2 g/d, a distribution of strength of 10.8%, an elongation of 3.0% and a modulus of elasticity of 990 g/d.

Comparative Example 1

Melt spinning was conducted in the same manner as described in Example 1 except for changing the compression ratio of the screw to 1.7. Filaments spun from the nozzle contained a number of bubbles and many of them were broken; adequate windup was impossible. When the spinning temperature was changed by 5° C. lower or higher, no effect was observed. The number of bubbles in the fibers obtained was 60 to 70 per meter. This means that the influence of screw was large.

Comparative Example 2

Melt spinning was conducted in the same manner as described in Example 1 except for changing the compression ratio of the screw to 4.5. Since the rotation load of screw was increased, the cylinder temperature was raised to 375° C., but the load was hardly affected. When the cylinder temperature was raised to 380° C., the load was lowered, but the spinning was not continuous and a large amount of filament breaking took place. Further, the spinnerette surface became dirty and stable spinnng was not able to be attained.

EXAMPLE 2

Melt spinning was conducted in the same manner as described in Example 1 except for changing the compression ratio of the screw to 2.7. The same continuous spinning as in Example 1 was possible. The number of bubbles in the fibers obtained was 10.7 per meter. When the obtained fibers were treated at 320° C. for 3 hours in nitrogen, the resulting fibers had a fineness of 3.39 denier, a strength of 27.8 g/d and a strength distribution of 12.1%.

EXAMPLE 3

Melt spinning was conducted in the same manner as described in Example 1 except for changing the compression ratio of the screw to 3.7. The screw rotation load was increased slightly compared with that of Example 1, but it was possible to conduct spinning without broken filaments under the same conditions as in Example 1. The number of bubbles in the fibers obtained was 8.1 per meter. When the obtained fibers were treated at 320° C. for 3 hours in nitrogen, the resulting fibers had the fineness of 3.36 denier, a strength of 28.8 g/d and a strength distribution of 10.3%.

EXAMPLE 4

Using the polyester obtained in Reference Example 2, melt spinning was conducted in the same manner as described in Example 1. Filaments were spun continuously from 150 orifices without broken filaments. The number of bubbles in the fibers obtained was 9.2 per meter. When the obtained fibers were treated at 320° C. for 3 hours in nitrogen, the resulting fibers had a fineness of 4.62 denier, a strength of 21.8 g/d and a strength distribution of 10.8%. Comparative Example 3

Melt spinning was conducted in the same manner as described in Example 4 except for changing the compression ratio of the screw to 1.7. Many of the filaments broke. When the cylinder temperature was changed to 5° C. higher or lower, no effect was observed and continuous spinning was impossible.

EXAMPLE 5

Using the polyester obtained in Reference Example 1, melt spinning was conducted using a screw type extruder having one axis of 30 mm in diameter. The screw had an effective length of 990 mm, and a compression ratio of 3.5. The helical structure in the portion between 140 mm to 250 mm from the top of the screw to a hopper side was different from that of the rest of the portion in that 3 projections having an arc length of 20 mm with 4 mm wide and 1 mm high were attached to the same periphery of the screw and were arranged in 10 rows along the lengthwise direction. A set of 3 projections and another neighboring set of 3 projections formed a helicoid and positions occupied by projections in every other set were arranged in a line. At the top of the screw, 3 pieces of plain weave metal net of 400 mesh (Tyler standard) and a die having 30 orifices with each 1 mm in diameter were attached. The resin was extruded at a cylinder temperature of 370° C. to give filaments having a fineness of 200 to 300 μm. The bubbles in the filaments were smaller than 30 μm in all the cases.

Then, using the screw mentioned above and joining a gear pump and a spinneret thereto, melt spinning was conducted at 370° C. The nozzle had 300 orifices with each 0.1 mm in diameter. The spinning was carried out continuously for 1 hour without broken filaments to give pale yellow transparent fibers. When the fibers were treated at 320° C. for 3 hours in nitrogen, the resulting fibers had a fineness of 3.18 denier, a strength of 29.5 g/d a strength distribution of 10.3%, an elongation of 3.0% and a modulus of elasticity of 1,010 g/d.

EXAMPLE 6

Using the polyester obtained in Reference Example 2, melt spinning was conducted at 365° C. using the same screw as used in Example 5. Bubbles at the top of the screw were smaller than 30 μm in all cases. The spinning could be conducted continuously for about 1 hour without causing breaking of filaments to give pale yellow transparent fibers. When the fibers were treated at 320° C. for 3 hours in nitrogen, the resulting fibers had a fineness of 4.26 denier, a strength of 22.6 g/d, a strength distribution of 11.2%, an elongation of 2.8% and a modulus of elasticity of 810 g/d.

What is claimed is:

1. A process for melt spinning an aromatic polyester with a flow temperature of 280° to 380° C. showing optical anisotropy in the molten state, which comprises melting powders, granules or pellets of the aromatic polyester using a screw-type extruder having a compression ratio of 2.5 to 4.0; thereby inhibiting entrapment in the resultant molten polyester of gases present in or on the powders, granules or pellets being melted; and by back pressure of the molten polyester sending gas generated by decomposition of the molten polyester to a back portion of the extruder; and then extruding and melt spinning the molten polyester at a temperature of 280° C. to 420° C.

2. A process for melt spinning an aromatic polyester as set forth in claim 1 wherein the polyester comprises 40–70% by mole of p-hydroxybenzoic acid residual groups, 15–30% by mole of aromatic dicarboxylic acid residual groups, and 15–30% by mole of aromatic diol residual groups.

3. A process for melt spinning an aromatic polyester as set forth in claim 1 wherein the polyester comprises a copolyester obtained from at least one member selected from the group consisting of terephthalic acid and isophthalic acid, and at least one member selected from the group consisting of chlorohydroquinone, phenylhydroquinone, and hydroquinone.

4. A process for melt spinning an aromatic polyester as set forth in claim 1 wherein the polyester comprises 20–80% by mole of p-hydroxybenzoic acid residual groups and 20–80% by mole of 2-hydroxynaphthalene-6-carboxylic acid residual groups.

* * * * *

UNITED STATES PATENT AND TRADEMARK OFFICE
CERTIFICATE OF CORRECTION

PATENT NO. : 4,871,501
DATED : October 3, 1989
INVENTOR(S) : Hiroaki SUGIMOTO et al.

It is certified that error appears in the above-indentified patent and that said Letters Patent is hereby corrected as shown below:

Title page, item [75], delete "Kazuo Hayatsu, Ibaraki;".

Signed and Sealed this

Twentieth Day of February, 1996

Attest:

BRUCE LEHMAN

Attesting Officer

Commissioner of Patents and Trademarks